(No Model.)
E. PAULSEN.
PLOW SHOVEL.
No. 470,503. Patented Mar. 8, 1892.
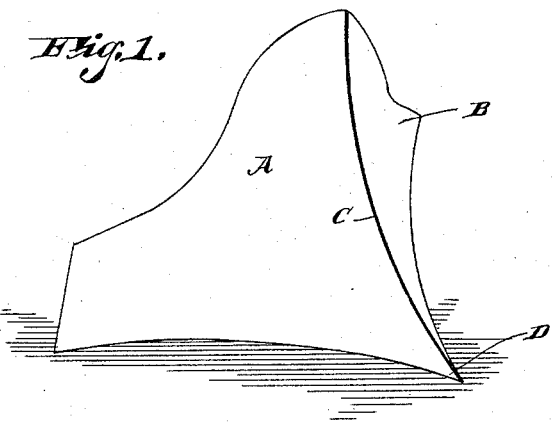
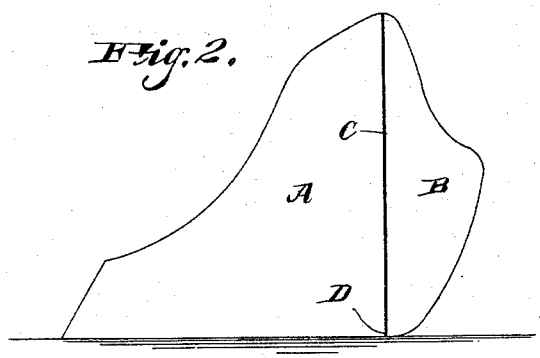
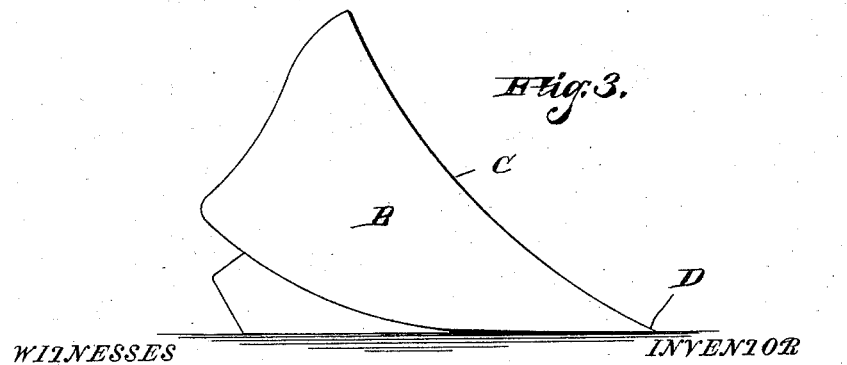
WITNESSES
Samuel Ker.
Philip E. Masi.
INVENTOR
Erik Paulsen,
by E. W. Anderson
his Attorney.

UNITED STATES PATENT OFFICE.

ERIK PAULSEN, OF LARCHWOOD, IOWA.

PLOW-SHOVEL.

SPECIFICATION forming part of Letters Patent No. 470,503, dated March 8, 1892.

Application filed September 19, 1891. Serial No. 406,240. (No model.)

*To all whom it may concern:*

Be it known that I, ERIK PAULSEN, a subject of the King of Sweden and Norway, and a resident of Larchwood, in the county of Lyon and State of Iowa, have invented certain new and useful Improvements in Corn-Plow Shovels; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view. Fig. 2 is a front view, and Fig. 3 is a side view.

This invention has relation to certain new and useful improvements in cultivator teeth or shovels; and it consists in the novel construction and combination of parts, as hereinafter specified.

The object of the invention is to provide a tooth or shovel the use of which will leave the soil loose and even, which will turn all weeds under, and which may be run near the hill or drill without injury to the plants. This I accomplish by the shape and arrangement of the various parts, which will now be described.

In the accompanying drawings, the letter A designates what may be termed the "mold-board" of the shovel, and B the landside. These are both formed in one piece and are each of general triangular shape standing in oblique relation to each other, their upper joined edges forming the curved line C. The lower front corner portions of each are extended forwardly to form the sharp point D. Both the mold-board and landside are concaved, and the lower edges of their rear faces are ground to give them a cutting lower edge. The lower edge of the mold-board lies in a horizontal plane and is slightly curved outwardly at the rear portion. A straight line joining the upper and lower edges of the mold-board will have an inclination from the horizontal somewhat greater than forty-five degrees, (about fifty degrees,) while a line from the upper to the lower edge of the landside has an inclination from the horizontal less than ninety degrees, (about seventy-five.) The lower edge of the landside as it extends rearwardly is cut up or above the horizontal, as shown, thus allowing the share to run close to the hills or drills without injury to the roots of the plants. The inclination of the sides A and B is such that all small weeds are completely turned under instead of being pushed over, the soil being left smooth and even, preventing liability to wash during heavy rains.

These shovels are suitably connected to shanks and may be changed from one side of the plow or cultivator to the other, according as it is desired to carry a greater or less amount of soil toward the plants.

Having described this invention, what I claim as new, and desire to secure by Letters Patent, is—

A cultivator-shovel having concaved sides obliquely disposed with vertical relation to each other, the two sides having unequal degrees of inclination, one of said sides having its lower edge extended rearwardly in a curved horizontal plane, the other side having its rearwardly-extending lower edge curved or cut above the horizontal, both of said sides being of general triangular form, integral one with the other, and having their lower edges ground or sharpened, substantially as specified.

In testimony whereof I affix my signature in presence of two witnesses.

ERIK PAULSEN.

Witnesses:
 CHAS. SHADE,
 W. D. CASE.